(12) United States Patent
Young et al.

(10) Patent No.: US 7,527,291 B2
(45) Date of Patent: May 5, 2009

(54) AIRBAG INFLATION WITH SLIDING BAFFLE

(75) Inventors: Anthony M. Young, Malad, ID (US); Kenneth J. Clark, Morgan, UT (US); Scott Jackson, Centerville, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 11/899,255

(22) Filed: Sep. 5, 2007

(65) Prior Publication Data

US 2009/0058059 A1 Mar. 5, 2009

(51) Int. Cl.
*B60R 21/26* (2006.01)
(52) U.S. Cl. .................. 280/737; 280/741; 280/742
(58) Field of Classification Search .............. 280/737, 280/741, 736, 742
See application file for complete search history.

(56) References Cited

U.S. PATENT DOCUMENTS

| 5,345,876 | A | * | 9/1994 | Rose et al. | ................. | 102/531 |
|---|---|---|---|---|---|---|
| 5,622,381 | A | * | 4/1997 | Mossi et al. | ................ | 280/737 |
| 6,131,948 | A | | 10/2000 | Cuevas | | |
| 6,543,806 | B1 | * | 4/2003 | Fink | ............................ | 280/737 |
| 6,557,890 | B1 | * | 5/2003 | Karlin et al. | ................ | 280/741 |
| 6,834,885 | B2 | * | 12/2004 | Mizuno et al. | ............. | 280/737 |
| 6,857,657 | B2 | * | 2/2005 | Canterberry et al. | ........ | 280/737 |
| 6,883,830 | B2 | | 4/2005 | Nakayasu et al. | | |
| 7,007,610 | B2 | | 3/2006 | Karlin et al. | | |
| 2004/0195812 | A1 | * | 10/2004 | Canterberry et al. | ........ | 280/737 |

\* cited by examiner

*Primary Examiner*—Toan C To
(74) *Attorney, Agent, or Firm*—Sally J Brown; Madison IP

(57) ABSTRACT

A new type of airbag inflator is described. The airbag inflator includes a chamber that houses a quantity of inflation gas. The inflation gas is capable of filling and deploying an airbag. The inflator also includes a membrane that seals the chamber. A sliding baffle is also added to the inflator. The sliding baffle is positioned proximate the membrane. The sliding baffle has a membrane rupture mechanism and a plurality of gas flow holes. Upon initiation of the inflator, the sliding baffle slides to cause the rupture mechanism to fail the membrane. The rupture mechanism fails the membrane by detaching a single piece from the membrane. The single piece is sufficiently large such that it remains within the inflator (or within the sliding baffle) and does not pass through one of the gas flow holes.

20 Claims, 3 Drawing Sheets

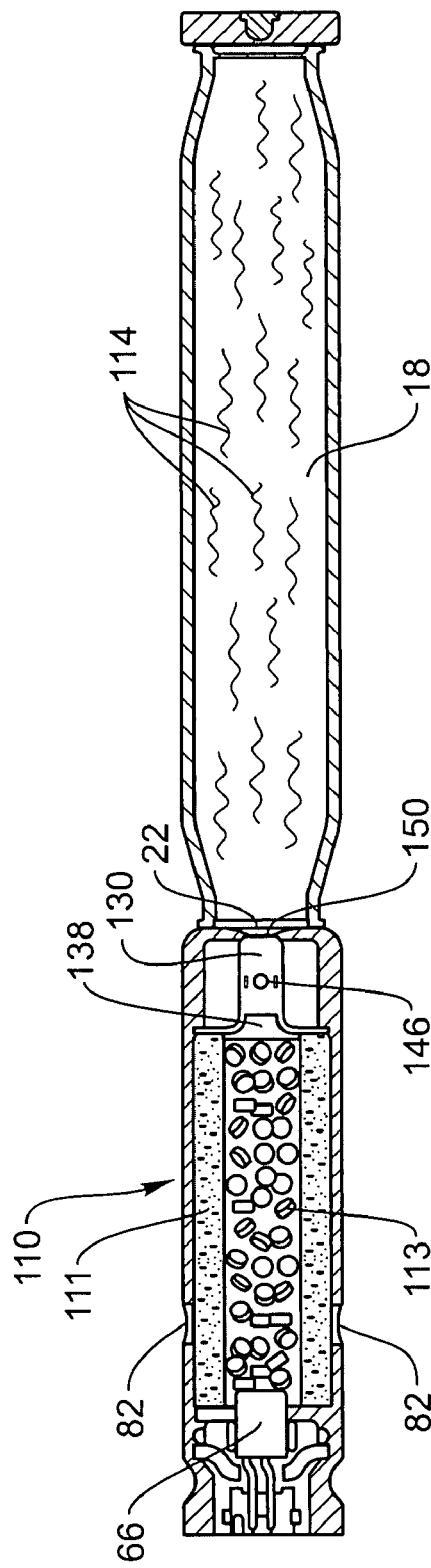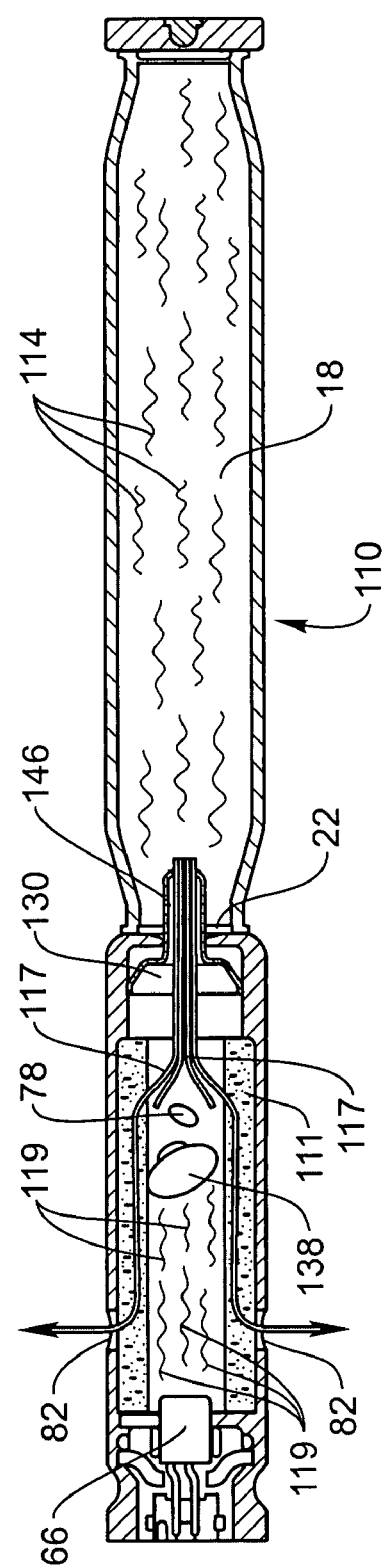

AIRBAG INFLATION WITH SLIDING BAFFLE

BACKGROUND OF THE INVENTION

Airbags have been known and established as improving the safety of motor vehicles. Accordingly, the inclusion of airbags on motor vehicles is now a requirement in many countries. These airbags (or airbag systems) take on a variety of different forms including steering wheel airbags, passenger airbags, dashboard airbags, side-impact airbags (often called inflatable curtain airbags), etc.

All airbag systems include an inflator or other similar device that is designed to rapidly produce/channel a large quantity of inflation gas into the airbag in the event that a sensor detects a crash condition. This influx of inflation gas into the airbag inflates and deploys the airbag from a stowed configuration. In general, this deployment of the airbag causes the airbag to become positioned at a location within the interior of the vehicle that will protect the occupant and prevent the occupant from harmful impact with the steering wheel, the dashboard, the vehicle door, and/or other portions of the vehicle interior.

One type of airbag inflator known in the art is a stored gas inflator. These inflators generally contain a sealed chamber that houses a quantity of inflation gas. Accordingly, in the event of an accident, the inflator will unseal the chamber and the quantity of inflation gas will flow out of the inflator into the airbag. Such stored gas inflators are commonly used in the industry, especially in conjunction with inflatable curtain or side-impact airbag systems.

Currently, many airbag manufacturers are making attempts to increase the size of the airbags installed in the vehicle. This is especially true for inflatable curtain airbags which are designed to be sufficiently large that they will cover the entire length of the side of the vehicle interior. However, in order to make these larger airbags, modifications to inflators must also be made in order for the airbag to be inflated within the desired timeframe. For example, in order for a large airbag to be inflated in a timely manner, the exit orifice of the inflator (i.e., the area through which the gas leaves the inflator) must be made ever larger so that the inflation gas can exit the inflator faster and fill the larger volume airbag in the requisite time. As this gas orifice of the inflator gets larger, the sealing membrane (i.e., the seal that holds the gas in the inflator prior to deployment) must also become larger and stronger in order to contain the pressurized gas in the storage chamber.

Unfortunately, the use of such stronger, larger membranes creates significant problems for airbag manufacturers. For example, it is known that as the membrane increases in strength, it becomes more difficult to rupture the membrane reliably. Accordingly, complex rupturing systems (including projectiles, pyrotechnics, and/or other membrane-puncturing devices) have been implemented in order to ensure that the membrane will be properly ruptured during deployment. Of course, the use of these complex rupturing systems increases the overall cost of the inflator and airbag system.

Further, these complex membrane rupturing systems sometimes rupture the membrane into small fragments which, if unguarded, can mix with the inflation gas and undesirably flow into the airbag. As a result, manufacturers are forced to use filters to capture the small membrane fragments and prevent such fragments from entering the airbag. Again, the use of such filters increases the overall cost and complexity of the inflator and the airbag system.

Accordingly, there is a need in the art for a new type of airbag inflator and membrane rupturing device that is inexpensive, reliable, easy to manufacture, etc. and does not allow membrane fragments to mix with inflation gas. Such a device is disclosed and taught herein.

BRIEF SUMMARY OF THE INVENTION

An airbag inflator is described herein. The airbag inflator comprises a chamber that houses a quantity of pressurized inflation gas and a membrane that seals the chamber. A sliding baffle is also disposed within the inflator and is positioned proximate the membrane. In some embodiments, the sliding baffle is housed within an inflator end cap that is positioned adjacent to the chamber. The sliding baffle comprises a membrane rupture mechanism and a plurality of gas flow holes. The inflator is designed such that upon initiation of the inflator, the sliding baffle slides into contact with the membrane to cause the rupture mechanism to fail the membrane by detaching a single piece from the membrane. In general, this single piece is sufficiently large that it remains within the sliding baffle and does not pass through one of the gas flow holes.

Some embodiments will be constructed in which the inflator further comprises an initiator constructed such that the sliding of the sliding baffle is precipitated by a pressure change generated by actuation of the initiator. However, in some of the preferred embodiments, any and all undesirable byproducts generated by actuation of the initiator are isolated from the gas flow holes by a barrier wall.

Other embodiments will be constructed in which the rupture mechanism of the sliding baffle is a burst disk cutter. This burst disk cutter may be designed to cut out an area of the membrane such that the area is larger than the largest gas flow hole.

In some embodiments, a retaining feature may be added to the sliding baffle. The retaining feature holds the baffle proximate the membrane prior to initiation of the inflator. During actuation of the inflator, the retaining feature is disabled so that the sliding baffle can slide. After the sliding mechanism has slid and failed the membrane, embodiments may be constructed in which the baffle will reverse its slide, moving away from the chamber.

An end cap for use with a stored gas inflator is also described herein. This end cap is designed for use with an inflator having a chamber that is sealed by a membrane. The end cap includes a sliding baffle that has a membrane rupture mechanism and a plurality of gas flow holes. In some embodiments, the membrane rupture mechanism is positioned at a proximal end of the end cap and an initiator will be positioned at a distal end of the end cap. As explained herein, the end cap is designed such that upon initiation of the stored gas inflator, the sliding baffle slides to cause the rupture mechanism to fail the membrane by detaching a single piece from the membrane. This single, detached piece is sufficiently large such it remains within the sliding baffle and does not pass through one of the gas flow holes.

In other embodiments, the airbag inflator comprises a chamber housing a quantity of inflation gas and a membrane that seals the chamber. A sliding baffle may also be added to the inflator. The sliding baffle includes a membrane rupture mechanism and one or more gas flow holes. The sliding baffle may be positioned proximate the membrane. The inflator is configured such that upon initiation of the inflator, the sliding baffle slides to cause the rupture mechanism to fail the membrane. This failing of the membrane occurs by detaching a single piece. This single piece is sufficiently large that it remains within the inflator and does not pass through one of the gas flow holes.

In some embodiments, the sliding baffle further comprises a retaining feature that holds the baffle proximate the membrane prior to initiation of the inflator. In these embodiments, the retaining feature is disabled upon actuation of the inflator. Further embodiments are designed in which after failing the membrane, the sliding baffle reverses its slide and moves away from the chamber.

Embodiments may also be constructed in which a second chamber is added to the inflator. The second chamber houses a pyrotechnic material. The sliding baffle may be positioned within the second chamber prior to deployment of the inflator. Such embodiments may further be constructed in which after the single piece is detached from the membrane, the single piece is retained within the second chamber.

If a retaining feature is used with the embodiments comprising a second chamber, the sliding baffle may further be designed such that the retaining feature holds the baffle proximate the membrane prior to initiation of the inflator. Upon actuation of the inflator, the retaining feature is disabled. After the retaining feature is disabled, the retaining feature may be retained within the second chamber.

More specifically, embodiments may be constructed in which ignition of the pyrotechnic material creates gas that moves the sliding baffle to cause detachment of a single piece within the second chamber. As gas exits the inflator to inflate an airbag, the pressure in the second chamber is reduced until the pressurizing gas in the stored gas chamber has a pressure greater than that in the second chamber. Stored gas then passes through the second chamber and exits the inflator to maintain inflation of the airbag.

The present embodiments also relate to a method for preventing portions of a membrane from exiting an inflator. This inflator comprises a chamber housing a quantity of inflation gas, a membrane that seals the chamber, and a sliding baffle. The sliding baffle includes a membrane rupture mechanism and one or more of gas flow holes. The sliding baffle may also be positioned proximate the membrane. After the inflator has been provided, the step of sliding the sliding baffle towards the chamber may occur. The method also includes the step of failing the membrane with the rupture mechanism, wherein the failing occurs by detaching a single piece from the membrane. After the single piece has been detached, the single piece is retained such that it does not pass through one of the gas flow holes. In some embodiments, the single piece is retained within the sliding baffle. In other embodiments, the single piece is retained in a portion of the inflator.

Some embodiment of the method may include the further step of reversing the slide of the sliding baffle after the single piece has been detached. In other embodiments, the further step of isolating undesirable byproducts generated by actuation of the initiator is added to the method. These undesirable byproducts may be isolated from the gas flow holes by a barrier wall.

The present invention has been developed in response to the needs known in the art. Accordingly, the present embodiments relate to a "stored gas" airbag inflator having chamber that houses a quantity of stored gas under pressure. This quantity of stored gas can be used to inflate an airbag. In order to maintain the quantity of inflation gas within the chamber, a sealing membrane is added to seal the chamber.

The inflator also will include a sliding baffle that is positioned as part of an end cap. The end cap is positioned on the end of the inflator proximate the chamber. In fact, in some embodiments, the membrane will actually be positioned inside the end cap.

The sliding baffle is positioned proximate the membrane. In order to hold the sliding baffle proximate the membrane, one or more retaining features may be used. The retaining feature is a metal bar or other similar feature that extends from the sliding baffle and engages a portion of the inflator (such as a diffuser, the chamber wall, etc.). This engagement with the inflator holds the sliding baffle in the proper position. Retaining features may also be incorporated into the other inflator components such as the diffuser or the membrane bulkhead, etc. In other embodiments, the retaining feature could comprise a spring.

One or more gas flow holes are added to the sliding baffle. These gas flow holes are designed such that when the inflator is deployed, the inflation gas will exit out of the inflator by passing through the gas flow holes. An alternate embodiment may include formation or uncovering of gas flow panels in the diffuser or other component by movement of the baffle. However, prior to deployment, the inflator is sealed by the membrane such that the inflation gas cannot flow out of the gas flow holes.

The sliding baffle also comprises a membrane rupture mechanism (or "rupture mechanism") that is capable of rupturing/failing the membrane during actuation of the inflator. Any feature or element that is capable of cutting/puncturing the membrane may function as the rupture mechanism.

An initiator is also used in the present embodiments as a means for actuating the inflator. In some embodiments, the initiator is positioned on the interior of the sliding baffle and a barrier wall is added to separate/isolate the initiator from the gas flow holes. In other embodiments, the initiator is positioned outside of the sliding baffle.

When a crash occurs, a signal will be transmitted to the initiator which causes the initiator to actuate. In some embodiments, this actuation of the initiator will produce undesirable byproducts, including a flame, fragments, combustion effluents, and/or other products. These byproducts are captured behind the barrier wall and will not access the gas flow holes, nor will such byproducts be allowed to mix/intermingle with inflation gas. As many other inflators do not provide an adequate mechanism for separating these undesirable byproducts from the inflation gas, the inclusion of the barrier wall that provides this separation may be desirable.

Actuation of the inflator is caused by the actuation of the initiator. As the initiator actuates, a pressure change occurs around the initiator, i.e., the pressure around the initiator increases. This change in the pressure precipitates movement in the sliding baffle. More specifically, the increase in pressure pushes against the sliding baffle and disables the retention features. As a result, the sliding baffle slides (moves) toward the membrane.

The sliding of the baffle causes the rupture mechanism to fail the membrane. This failure of the membrane occurs by having the rupture mechanism detach (cut) a single piece from the membrane. Once the single piece has been detached, the chamber is no longer sealed by the membrane, and thus the inflation gas begins to escape the chamber. In turn, this flow of the inflation gas pushes against the detached single piece and causes the single piece to move into the interior of the baffle and/or against the barrier wall.

It should be noted that even though the detached, single piece of membrane is moved by the flow of the inflation gas, the detached single piece remains within the sliding baffle and does not pass through one of the gas flow holes. This occurs because the single piece is sufficiently large and is larger than the size of the largest gas flow hole. Accordingly, the detached, single piece simply cannot fit through the gas flow holes, and is thus retained within the interior of the sliding baffle.

It should also be noted that the flow of gas out of the chamber also pushes against the sliding baffle. Such contact between the baffle and the gas pushes against the sliding baffle and causes the baffle to "reverse its slide." In other words, the gas pushes against the sliding baffle and causes the baffle to move away from the chamber, thereby returning the sliding baffle to its original position (or positioning the sliding baffle close to its original position). It is also possible to retain pressure form the initiator such that the initiator pressure retained is sufficient to keep the baffle in the extended position. Either of these embodiments might be appropriate as position subsequent to the rupturing of the disk may not be important.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4A is a cross-sectional view of another embodiment of an inflator using the sliding baffle concept while also incorporating pyrotechnic material for additional gas output, wherein the inflator is shown prior to deployment; and FIG. 4B is a cross-sectional view of the embodiment of FIG. 4A shown after deployment.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the present embodiments, as represented in the Figures, is not intended to limit the scope of the invention, as claimed, but is merely representative of presently preferred embodiments of the invention.

Figure 1:
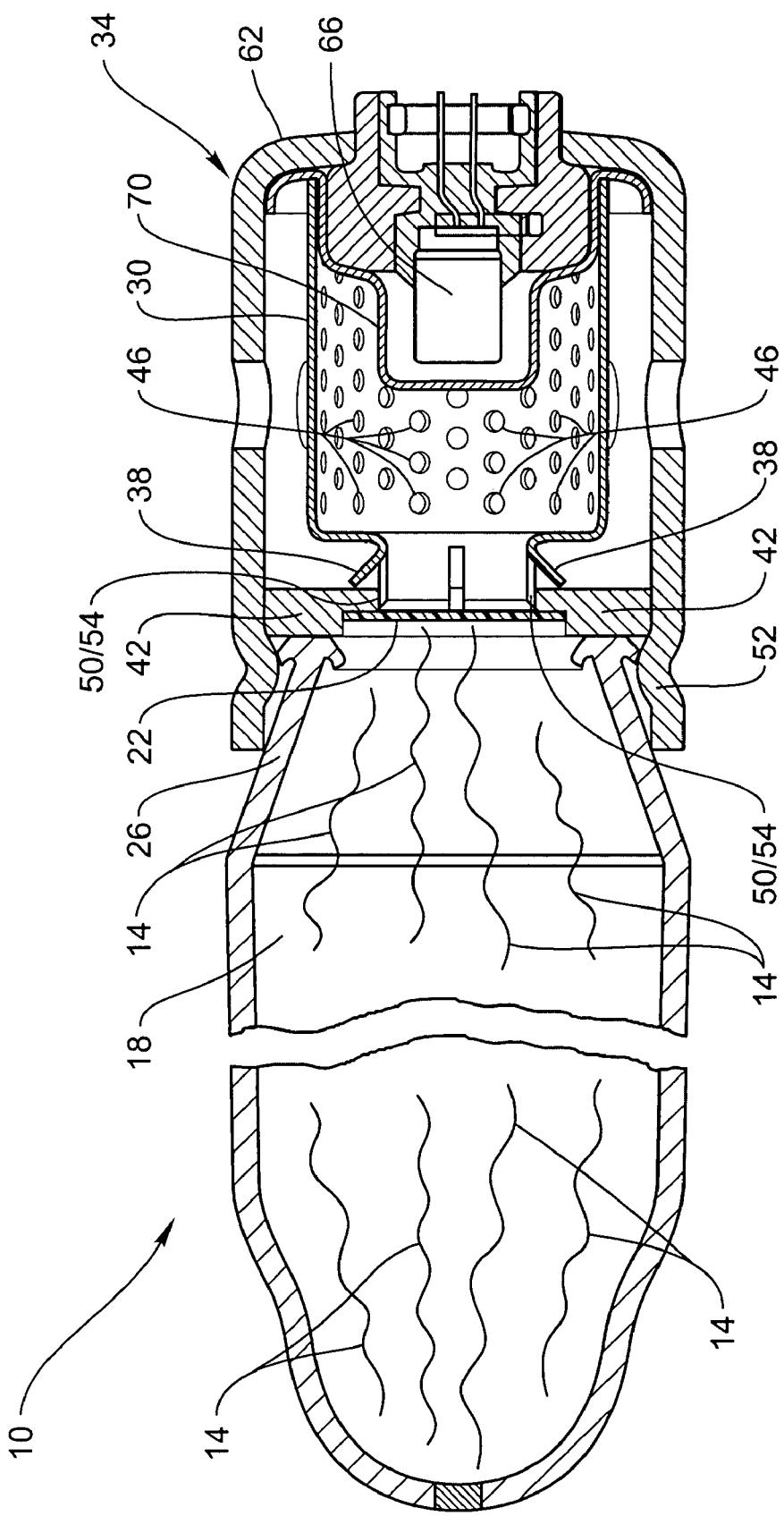
FIG. 1 is a cross-sectional view of an inflator according to the present embodiments that is shown prior to actuation of the initiator.

Referring now to FIG. 1, an embodiment of an airbag inflator 10 is illustrated. The airbag inflator 10 is capable of being installed onto a vehicle (not shown) and inflating an airbag (not shown) in the event of an accident or crash. The inflator 10 is typically made of metal and is cylindrical in shape. However, other shapes and/or configurations of the inflator 10 are also possible.

The inflator 10 is a "stored gas" inflator, which means that it has a quantity of inflation gas 14 stored under pressure within the inflator 10. In general, the inflator 10 comprises a chamber 18 that houses the quantity of inflation gas 14. The amount of inflation gas 14 is generally selected such that it will inflate the airbag in the event of a crash. Accordingly, if a larger airbag is desired, it may be necessary to use a larger quantity of inflation gas 14. Likewise, if the airbag is smaller, more compact, a lesser quantity of inflation gas 14 may be employed. Those of skill in the art will readily appreciate and understand how to tailor the quantity of inflation gas 14 necessary for each particular embodiment and/or airbag application.

In order to contain the quantity of inflation gas 14 within the chamber 18 prior to deployment, a sealing membrane 22 is added to the inflator 10. The membrane 22 is typically a "burst disk" that may be ruptured/punctured during deployment. As shown in FIG. 1, the membrane 22 is positioned at a throat 26 of the chamber 22. In some embodiments, including the embodiment shown in FIG. 1, the membrane 22 has a size/diameter that is larger than the size/diameter of the exit throat 27. In other embodiments, the membrane 22 will have a size/diameter that is equal to size/diameter of the throat 26 and/or the exit throat 27.

The inflator 10 also will include a sliding baffle 30, as is described in greater detail herein. The sliding baffle 30 is generally positioned as part of an end cap 34 that is added to the inflator 10. The end cap 34 is generally positioned such that it is proximate the membrane 22 and/or adjacent to the chamber 18. In fact, in some embodiments, the membrane 22 will actually be positioned inside the end cap 34.

As shown in FIG. 1, the sliding baffle 30 is positioned proximate the membrane 22. As used herein, the term "proximate the membrane" means that the sliding baffle 30 is positioned adjacent to the membrane 22 such that it does not protrude through, puncture, and/or pierce the membrane 22. As shown in FIG. 1, the sliding baffle 30 is positioned adjacent the membrane 22. In other embodiments, all or a portion of the sliding baffle 30 may actually contact the membrane 22 (as long as this contact does not cause the sliding baffle 30 to protrude through, puncture, and/or pierce the membrane 22).

In order to hold the sliding baffle 30 in the proper position, one or more retaining features 38 may be added. The retaining feature 38 is a metal bar or other similar feature that extends from the sliding baffle 30 and engages a diffuser 42 or other portion of the inflator 10 and holds the sliding baffle 30 proximate the membrane 22. In further embodiments, a spring (or other similar feature) may be used to hold the baffle in the proper position.

The sliding baffle 30 also includes one or more gas flow holes 46. These gas flow holes 46 may be of different sizes and diameters (as shown in FIG. 1). The gas flow holes 46 are designed such that during deployment, the inflation gas 14 will exit out of the inflator 10 by passing through the gas flow holes 46.

The sliding baffle 30 also comprises a membrane rupture mechanism 50 that is capable of rupturing/failing the membrane 22 during deployment of the inflator 10. This rupture mechanism 50 is positioned proximate the membrane 22 and may be positioned proximate a proximal end 52 of the end cap 34. In other embodiments, the rupture mechanism 50 is positioned at, proximate, or near the diffuser 42. In some embodiments, the rupture mechanism 50 may be attached to one or more of the retaining features 38. In the embodiment shown in FIG. 1, the rupture mechanism 50 comprises a burst disk cutter 54 with sharp edges that are capable of puncturing the membrane 22. In other embodiments, the rupture mechanism 50 may simply be a sharp edge of the sliding baffle 30. In other embodiments, the rupture mechanism 50 may be an external feature, such as a knife, blade, etc., that is added to the sliding baffle 30. In fact, any feature or element that is capable of cutting/puncturing the membrane 22 may function as the rupture mechanism 50.

As shown in FIG. 1, the sliding baffle 30 extends along the entire length of the end cap 34 such that the distal end 58 of the sliding baffle 30 is positioned proximate a distal end 62 of the end cap 34. However, in other embodiments, the sliding baffle 30 will not extend along the entire length of the end cap 34.

An initiator 66 is also added to the inflator 10. The initiator 66 is of the type known in the art and is positioned in the end cap 34 proximate the distal end 62. The initiator 66 is designed such that it will cause actuation of the inflator 10. More specifically, when an accident or crash occurs, a signal will be sent to the initiator 66 which causes the initiator 66 to actuate. As will be explained herein, this actuation of the initiator 66 causes the inflator 10 to deploy and allow the inflation gas 14 to deploy the airbag.

As shown in FIG. 1, the initiator 66 is positioned within the interior of the sliding baffle 30. However, a barrier wall 70 is added to separate/isolate the initiator 66 from the gas flow holes 46 of the sliding baffle 30.

Figure 2:
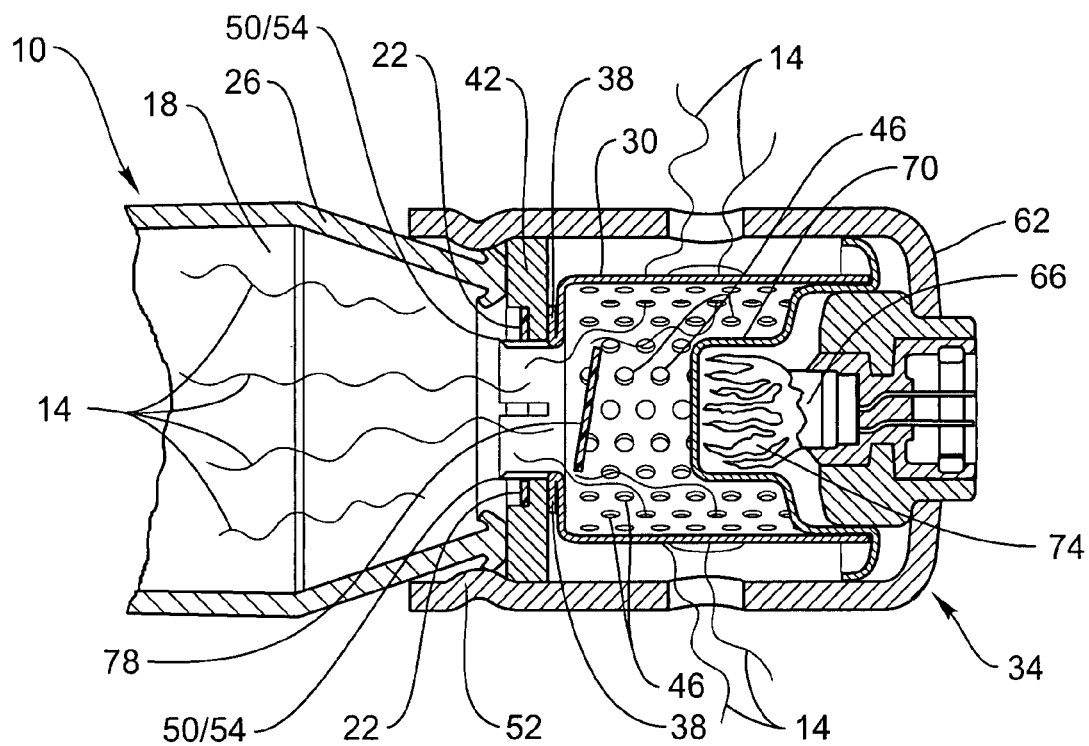
FIG. 2 is a cross-sectional view of the inflator of FIG. 1 that is illustrated after the initiator has been actuated.

As shown in FIG. 1, the inflator 10 is in the undeployed configuration in which the inflation gas 14 is stored in the chamber 18. The deployment of the inflator 10 will now be discussed in conjunction with FIGS. 2 and 3. FIG. 2 is a cross-sectional view that illustrates the inflator 10 as the initiator 66 is actuated. Specifically, upon receipt of the appropriate signal, the initiator 66 will actuate. In some embodiments, this actuation of the initiator 66 will produce a flame, fragments, combustion effluents, and/or other products produced by actuation of the initiator 66 (which are referred to collectively herein as "undesirable byproducts" and are represented graphically in FIG. 2 with reference numeral 74) will be captured behind the barrier wall 70 and will not access the gas flow holes 46, nor will such undesirable byproducts 74 be allowed to mix/intermingle with inflation gas 14.

The actuation of the initiator 66 (as well as the production of the undesirable byproducts 74) actuates the inflator 10 and produces a pressure change around the initiator 66. This pressure change increases the pressure around the initiator 66 and pushes against the sliding baffle 30. In turn, the force generated by this pressure differential disables the retention feature(s) 38, thereby allowing the sliding baffle 30 to slide toward the membrane 22. In the embodiment shown in FIG. 2, this disabling of the retention features 38 occurs by bending the retention features 38 away from the diffuser 42. However, other means or mechanisms for disabling the retention features 38 may also be used.

As the sliding baffle 30 slides toward the membrane 22, the rupture mechanism 50 contacts the membrane 22 and causes the membrane to fail. More specifically, the rupture mechanism 50 fails the membrane by detaching a single piece 78 from the membrane 22. In some embodiments, this single piece 78 will be a circular-shaped member that is cut out of the membrane 22 by the rupture mechanism 50/burst disk cutter 54. However, other shapes and/or configurations for the single piece 78 are also possible. In some embodiments, the single piece 78 will be smaller than the throat 26. Other embodiments have the single piece 78 be the same size (or larger) than the throat 26.

Once the single piece 78 has been detached from the membrane 22, the inflation gas 14 in the chamber 18 (which has been stored under pressure) immediately pushes against the single piece 78 and begins to flow out of the chamber 18 through the ruptured membrane 22. As shown in FIG. 2, this flow of the inflation gas 14 pushes the single piece 78 away from the membrane 22 and towards the distal end 62.

Figure 3:
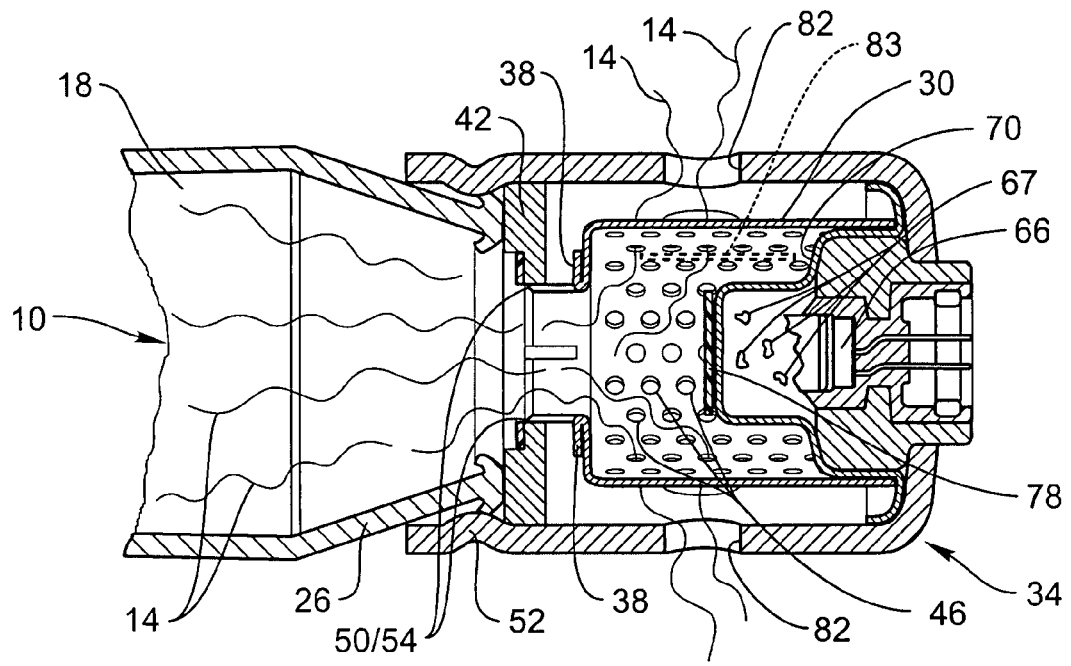
FIG. 3 is a cross-sectional view of the inflator of FIG. 2 that is shown as the inflation gas flows out of the inflator.

FIG. 3 shows the deployment of the inflator 10 after the single piece 78 has been detached from the membrane 22. Once the single piece 78 has been detached, the inflation gas 14 pushes the single piece against the barrier wall 70 such that the single piece 78 does not interfere with the flow of the inflation gas 14 through the sliding baffle 30 via the gas flow holes 46. Once the inflation gas 14 exits the sliding baffle 30, the inflation gas 14 may then exit the inflator 10 via inflator openings 82 and be used to inflate an airbag.

As shown in FIG. 3, one or more fragments 67 are also captured and retained behind the wall 70. These fragments 67 may be part of the undesirable byproducts 74 (shown in FIG. 3). These fragments 67 are formed from the actuation of the initiator 66. The wall 70 prevents the fragments 67 from exiting the inflator 10.

In the embodiment shown in FIG. 3, the inflation gas 14 exits the chamber 18 and pushes the sliding baffle 30 towards the distal end 62. Accordingly, such force upon the sliding baffle 30 causes the baffle 30 to "reverse its slide" and to move away from the chamber 18. Thus, as shown in FIG. 3, the sliding baffle 30 has slid back such that it is at or near its original position—i.e., in a position in which the distal end 58 of the sliding baffle 30 is proximate the distal end 62 of the end cap 34.

It should be noted that after the single piece 78 is moved (via the flow of the inflation gas 14) adjacent to the barrier wall 70, the single piece 78 remains within the sliding baffle 30 and does not pass through one of the gas flow holes 46. This occurs because the size/diameter of the single piece 78 is selected (i.e., by adjusting the size of the rupture mechanism 50) so that the area of the single piece is greater than the area/diameter of the largest gas flow hole 46. The single piece 78 is simply too large to be able to pass through one or more of the gas flow holes 46 and as a result, the single piece 78 is prevented from exiting the inflator 10 and/or entering the airbag.

As shown in FIG. 3, further embodiments of the inflator 10 may be constructed in which a filter 83 is positioned inside of the sliding baffle 30. This filter 83 will allow the gas 14 to flow through the filter 83. However, the filter 83 may provide further filtering of the gas prior to the gas passing through the gas flow holes 46.

Referring now to FIG. 4A, a second embodiment of an inflator 110 according the present invention is illustrated. The inflator 110 is similar to the inflator 10 discussed above. In fact, the components of the inflator 110 are similar to the components of the inflator 10. Accordingly, for purposes of brevity, this description will not be repeated. Further, those of skill in the art will recognize that many of the components/elements of the inflator 10 may also be incorporated into the inflator 110 (regardless of whether these components/elements are actually shown in FIG. 4A).

The inflator 110 comprises a chamber 18 and a quantity of stored gas 114. This chamber 18 is sealed by a sealing membrane 22. The inflator 110 also includes a second chamber 111 that includes a quantity of pyrotechnic material 113. The pyrotechnic material 113 is capable of producing a quantity of gas upon ignition.

An initiator 66 may also be included in the inflator 110. The initiator 66 is positioned in or proximate the second chamber 111. The initiator 66 is capable of igniting the pyrotechnic material 113.

A sliding baffle 130 may also be added to the inflator 110. In this embodiment, the sliding baffle 130 is positioned within the second chamber 111. The sliding baffle 130 may include one or more gas flow holes 146 through which gas may flow (upon actuation). Although one hole 146 is illustrated, those of skill in the art will recognize that more than one gas flow hole 146 may also be used.

A retaining feature 138 may also be added. This retaining feature 138 is designed to hold the sliding baffle 130 proximate to the sealing membrane 22 prior to deployment of the inflator 110. The retaining feature 138 prevents the sliding baffle 130 from contacting the membrane 22 prior to deployment. In the embodiment shown in FIG. 4A, the feature 138 is a plug that engages the sliding baffle 130. Of course, other types of components and features that retain the sliding baffle 130 may also be use as the retaining feature 138.

The sliding baffle 130 may also include a rupture mechanism 150. The rupture mechanism 150 is designed to rupture/fail the membrane 22 during deployment. The rupture mechanism 150 may be similar to the features discussed above.

Referring now to FIG. 4B, the deployment of the inflator 110 will now be discussed. Upon actuation of the initiator 66, the initiator 66 will ignite/combust the pyrotechnic material 113, thereby creating gas 119. This gas 119 may then exit the inflator 110 via openings 82 and may be used to inflate the airbag (not shown in FIG. 4B). In some embodiments, the openings 82 will be sealed prior to actuation of the initiator 66. In these embodiments, the actuation of the initiator 66 operates to unseal/open the openings 82 so that the gas 119 may vent out of the inflator 110.

The actuation of the inflator 110 (and more specifically, the actuation of the initiator 66) overcomes retaining feature 138. In the embodiments shown in FIG. 4B, this occurs by having the retaining feature 138 separate from the sliding baffle 130. (The way in which the retaining member 138 may separate from the baffle 130 is explained below). Because the retaining feature 138 is separated from the sliding baffle 130, the feature 138 no longer engages and retains the sliding baffle 130.

It should be noted that once the retaining feature 138 is separated from the sliding baffle 130, the retaining feature 138 may be retained within the inflator 110. More specifically, the retaining feature 138 may be retained within the second chamber 111. Usually, the size of the retaining feature 138 will be selected such that, even when separated from the sliding baffle 130, the retaining feature 138 larger than the openings 82. Accordingly, the retaining feature 138 cannot fit through the openings 82 and is thus retained in the inflator 110.

After ignition of the pyrotechnic material, a gas is formed that causes the sliding baffle 130 to slide towards the sealing membrane 22. Such sliding of the sliding baffle 130 may be precipitated by the pressure change caused by actuation of the initiator 66 and/or combustion of the pyrotechnic material 113. In turn, this sliding of the baffle 130 ruptures the sealing membrane 22. This rupturing occurs via a membrane rupture mechanism 150.

In the embodiments shown in FIG. 4B, the rupture mechanism 150 is an edge or side that will puncture the membrane 22. Of course, in other embodiments, the burst disk cutter 54 (shown in FIGS. 1-3) may also be used as the rupture mechanism. Other features, such as cutters, sharp edges, puncturing devices, etc., may also be used.

Upon failing the membrane 22, the gas 14 in the chamber 18 may flow out of the chamber 14 by passing through the one or more of the gas flow holes 146. By passing through the flow holes 146, the gas 14 is able to flow through the sliding baffle 130, exit the chamber 18, and then exit the inflator 110 (via the openings 82). This gas flow path is shown via the arrow 117.

It should be noted that the rupture membrane mechanism 150 fails the membrane 22 by detaching (cutting) a single piece 78 from the membrane 22. This single piece 78 is sufficiently large such that it cannot pass though the gas flow hole(s) 146 in the baffle 130. The single piece 78 is also sufficiently large such that it cannot pass through the openings 82. Accordingly, the single piece 78 remains in the inflator 10. In the embodiment shown in FIG. 4B, the single piece 78 is retained in the second chamber 111. In other embodiments, the single piece 78 will be retained within the sliding baffle 130.

In some embodiments, after the sliding baffle 130 has ruptured the membrane 22, the sliding baffle 130 may reverse its slide. This means that the sliding baffle 130 moves in the opposite direction (i.e., towards the inflator 66). Such reversing of the slide is caused by the gas 114 escaping the chamber 18. As the gas 114 escapes, it pushes the baffle 130 and restraining member 138 away from the chamber 18. Such movement of the retaining member 138 separates the retaining member 138 from the baffle 130. Once the retaining member 138 is separated, it is retained in the inflator 110.

However, in other embodiments, the sliding baffle 130 will not reverse its slide. In some embodiments, the sliding baffle 130 will return completely to its undeployed position. In other embodiments, the baffle 130 only partially reverses its slide.

Those of skill in the art will readily recognize that the addition of a second chamber 111 with the pyrotechnic material 113 to the gas 14 stored in the chamber 18 increases the filling capacity of the inflator 110. Accordingly, this inflator 110 may be used to inflate large airbags.

Referring now to FIGS. 1 through 4 generally, the present embodiments also describe a method for preventing all or a portion of a membrane 22 from exiting an inflator 10, 110. In general, this method involves the step of providing an inflator 10, 110 which has a sliding baffle 30, 130. Once the inflator 10, 110 has been provided, the sliding baffle 30, 130 slides during actuation of the inflator 10, 110. This sliding causes the sliding baffle 30, 130 to move towards the chamber 18 housing the supply of inflation gas 14.

The sliding of the sliding baffle 30, 130 also fails the membrane 22. Such failing of the membrane 22 occurs via the rupture mechanism 50, 150. In general, this failing of the membrane 22 involves detaching the single piece 78 from the membrane 22.

Once the membrane 22 has been failed, the inflation gas 14 exits the chamber 18. In some embodiments, such exiting of the gas 14 reverses the slide of the sliding baffle 30, 130. At the same time, while the gas is escaping the inflator 10, the single piece 78 is retained within the inflator 10, 110. In some embodiments, the single piece 78 will be retained within the sliding baffle 30, 130 such that the single piece 78 does not pass through one of the gas flow holes 46, 146. Also, in some embodiments, the undesirable byproducts 74 are entrapped behind a barrier wall 70 (which may be a part of the sliding baffle).

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. An airbag inflator comprising:
   a chamber housing a quantity of inflation gas;
   a membrane that seals the chamber; and
   a sliding baffle comprising a membrane rupture mechanism and one or more gas flow holes, the sliding baffle being positioned proximate the membrane,
   wherein upon initiation of the inflator, the sliding baffle slides to cause the rupture mechanism to fail the membrane by detaching a single piece, wherein the single piece is sufficiently large that it remains within the sliding baffle and does not pass through one of the gas flow holes.

2. An airbag inflator as in claim 1 wherein the sliding baffle is housed within an end cap that is positioned adjacent to the chamber.

3. An airbag inflator as in claim 1 further comprising an initiator, wherein the sliding of the sliding baffle is precipitated by a pressure change generated by actuation of the initiator.

4. An airbag inflator as in claim 3, wherein undesirable byproducts generated by actuation of the initiator are isolated from the gas flow holes by a barrier wall.

5. An airbag inflator as in claim 1, wherein the sliding baffle further comprises a retaining feature that holds the baffle proximate the membrane prior to initiation of the inflator.

6. An airbag inflator as in claim 5, wherein the retaining feature is disabled upon actuation of the inflator.

7. An airbag inflator as in claim 1, wherein after failing of the membrane, the sliding baffle reverses its slide and moves away from the chamber.

8. An airbag inflator as in claim 1 wherein the rupture mechanism comprises a burst disk cutter.

9. An airbag inflator as in claim 8 wherein the burst disk cutter cuts out an area of the membrane such that the area is larger than the largest gas flow hole.

10. An airbag inflator as in claim 1 wherein a filter is inside of the sliding baffle.

11. An end cap for use with a stored gas inflator having a chamber that is sealed by a membrane, the end cap comprising a sliding baffle having a membrane rupture mechanism and a plurality of gas flow holes, wherein upon initiation of the stored gas inflator, the sliding baffle slides to cause the rupture mechanism to fail the membrane by detaching a single piece, wherein the single piece is sufficiently large such that it remains within the sliding baffle and does not pass through one of the gas flow holes.

12. An end cap as in claim 11 wherein the membrane rupture mechanism is positioned proximate a diffuser and an initiator is positioned at a distal end of the end cap.

13. An end cap as in claim 12 wherein the sliding of the sliding baffle is precipitated by a pressure change generated by actuation of the initiator.

14. An end cap as in claim 13 wherein after failing of the membrane, the sliding baffle reverses its slide and moves away from the chamber.

15. An airbag inflator comprising:
a chamber housing a quantity of inflation gas;
a membrane that seals the chamber;
a sliding baffle comprising a membrane rupture mechanism, the sliding baffle being positioned proximate the membrane; and
a second chamber that houses a pyrotechnic material, wherein the sliding baffle is positioned within the second chamber prior to deployment,
wherein upon initiation of the inflator, the sliding baffle slides to cause the rupture mechanism to fail the membrane by detaching a single piece, wherein the single piece is sufficiently large that it remains within the inflator, the sliding baffle further comprises a retaining feature that holds the baffle proximate the membrane prior to initiation of the inflator, wherein the retaining feature is disabled upon actuation of the inflator.

16. An airbag inflator as in claim 15 wherein after failing of the membrane, the sliding baffle reverses its slide and moves away from the chamber.

17. An airbag inflator as in claim 15 further comprising one or more gas flow holes in the sliding baffle, wherein upon actuation, the single piece is sufficiently large such that it does not pass through one or the gas flow holes.

18. An airbag inflator as in claim 17, wherein after single piece is detached, the single piece is retained within the second chamber.

19. A method for preventing portions of a membrane from exiting an inflator comprising:
providing an inflator comprising:
a chamber housing a quantity of inflation gas;
a membrane that seals the chamber; and
a sliding baffle comprising a membrane rupture mechanism and a one or more gas flow holes, the sliding baffle being positioned proximate the membrane,
sliding the sliding baffle towards the chamber;
failing the membrane with the rupture mechanism, wherein the failing occurs by detaching a single piece from the membrane;
reversing the slide of the sliding baffle;
retaining the single piece within the sliding baffle such that the single piece does not pass through one of the gas flow holes.

20. A method as in claim 19, further comprising the step of isolating undesirable byproducts generated by actuation of the initiator from the gas flow holes by a barrier wall.

* * * * *

UNITED STATES PATENT AND TRADEMARK OFFICE
CERTIFICATE OF CORRECTION

PATENT NO. : 7,527,291 B2
APPLICATION NO. : 11/899255
DATED : May 5, 2009
INVENTOR(S) : Anthony M. Young et al.

Page 1 of 1

It is certified that error appears in the above-identified patent and that said Letters Patent is hereby corrected as shown below:

On the cover page of the patent, replace item 74 *Attorney, Agent, or Firm* "Madison IP" with --Madson IP,--

Col. 12, claim 17, line 4, please replace "one or the gas flow holes" with --one of the gas flow holes--

Col. 12, claim 18, line 1, please replace "wherein after single piece" with --wherein after the single piece--

Signed and Sealed this

Eighth Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,527,291 B2
APPLICATION NO. : 11/899255
DATED : May 5, 2009
INVENTOR(S) : Anthony M. Young et al.

It is certified that error appears in the above-identified patent and that said Letters Patent is hereby corrected as shown below:

On the cover page of the patent, replace item 74 *Attorney, Agent, or Firm* "Madison IP" with --Madson IP,--

Col. 12, claim 17, line 24, please replace "one or the gas flow holes" with --one of the gas flow holes--

Col. 12, claim 18, line 25, please replace "wherein after single piece" with --wherein after the single piece--

This certificate supersedes the Certificate of Correction issued December 8, 2009.

Signed and Sealed this

Twenty-sixth Day of January, 2010

David J. Kappos
*Director of the United States Patent and Trademark Office*